W. H. DAVIS.
HARNESS AND VEHICLE RELEASING DEVICE.
APPLICATION FILED AUG. 24, 1908.
916,422.
Patented Mar. 30, 1909.
2 SHEETS—SHEET 1.
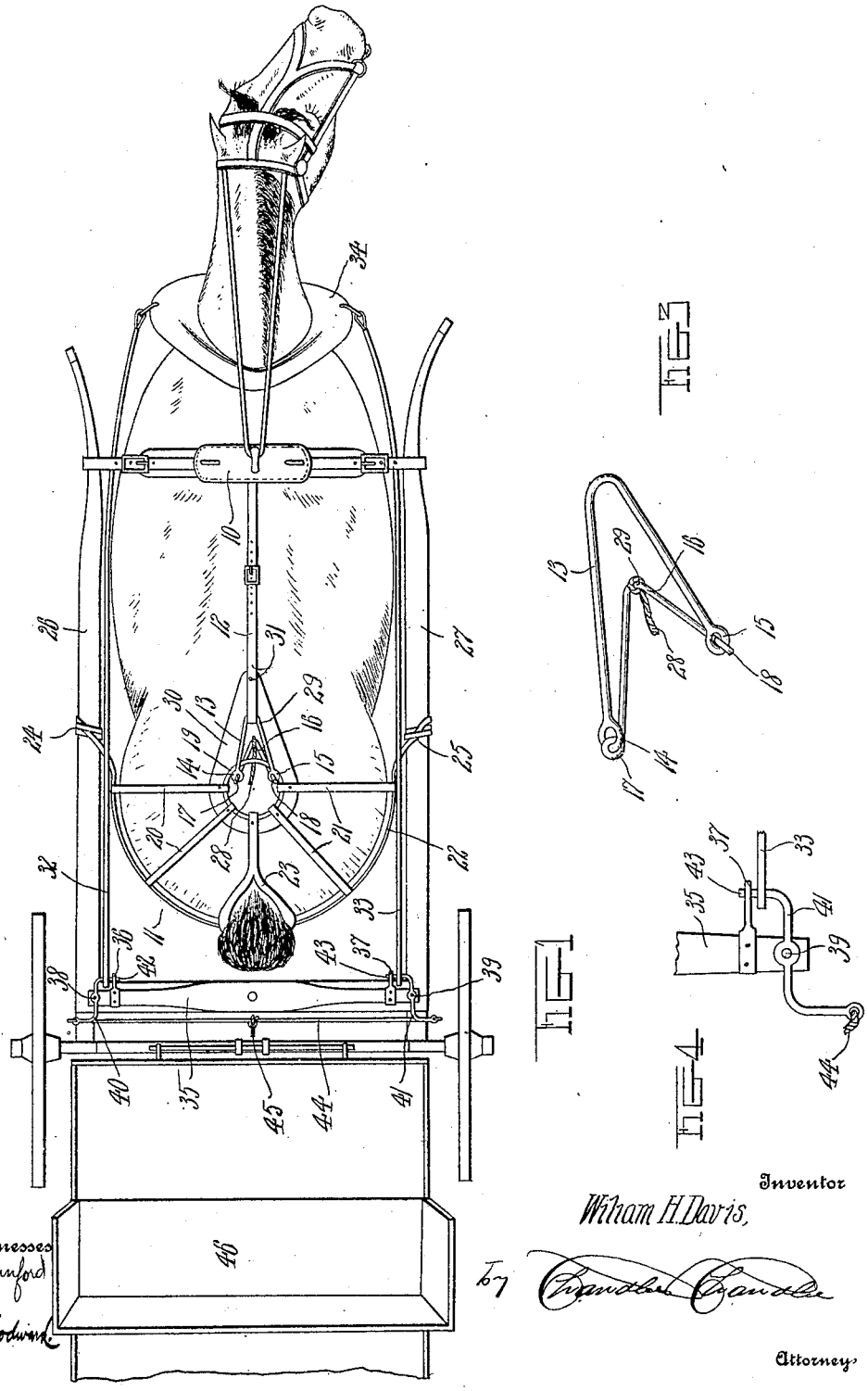
Witnesses
J. L. Cranford
C. N. Woodward
Inventor
William H. Davis,
by Chandler & Chandler
Attorneys

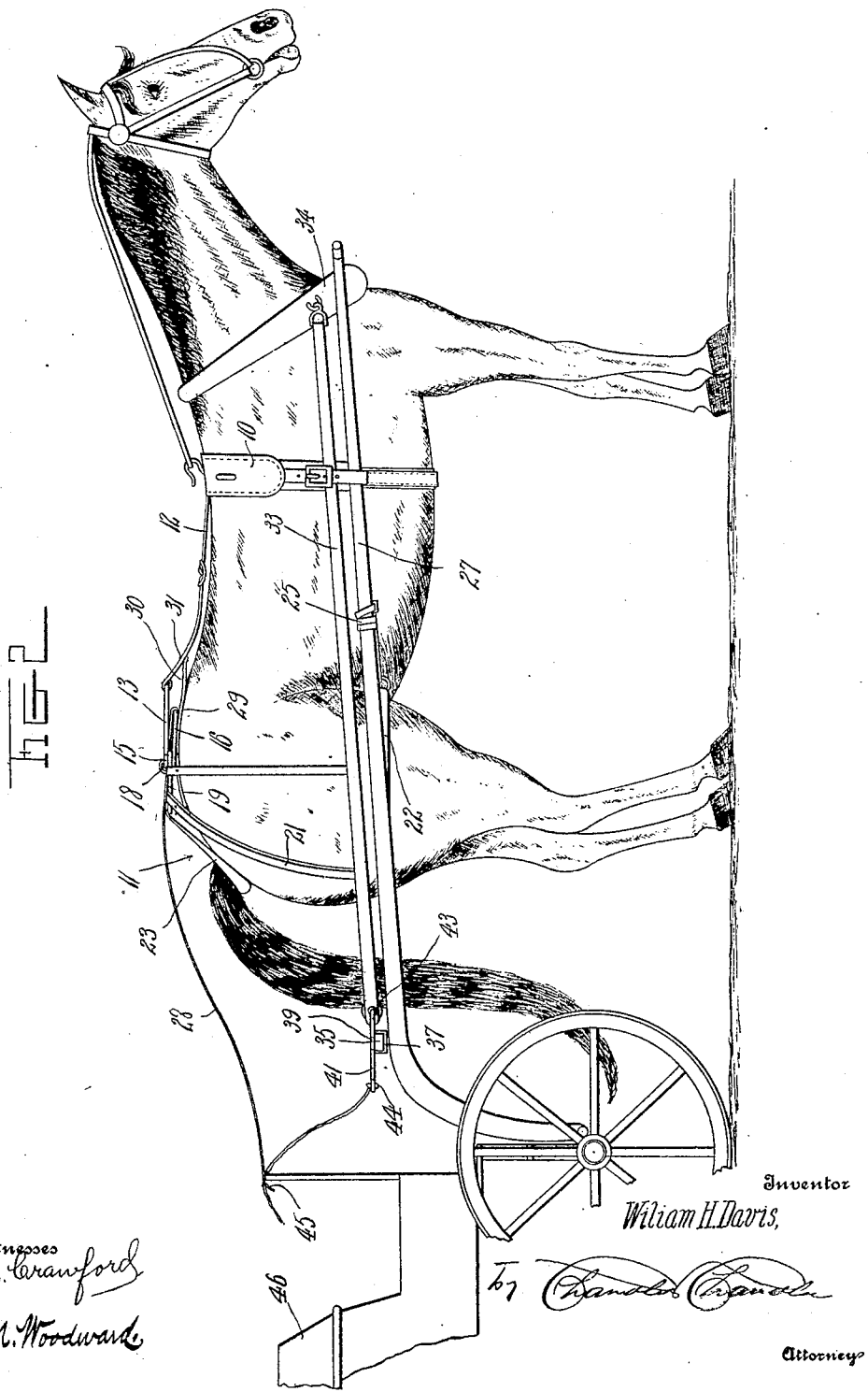

UNITED STATES PATENT OFFICE.

WILLIAM H. DAVIS, OF DELAY, MISSISSIPPI.

HARNESS AND VEHICLE RELEASING DEVICE.

No. 916,422.

Specification of Letters Patent.

Patented March 30, 1909.

Application filed August 24, 1908. Serial No. 450,050.

*To all whom it may concern:*

Be it known that I, WILLIAM H. DAVIS, a citizen of the United States, residing at Delay, in the county of Lafayette, State of Mississippi, have invented certain new and useful Improvements in Harness and Vehicle Releasing Devices; and I do hereby declare the following to be a full, clear, and exact description of the invention, such as will enable others skilled in the art to which it appertains to make and use the same.

This invention relates to improvements in harnesses, more particularly to the class of harnesses whereby provision is made for instantly releasing the horse from the harness and the vehicle to which it is attached in event of the animal running away or becoming unruly, and has for one of its objects to improve the construction and increase the efficiency and utility of devices of this character.

Another object of the invention is to provide a simply constructed device whereby the draft animal is instantly released from the vehicle by means operative from the driver's seat.

With these and other objects in view the invention consists in a rear harness portion comprising the breeching and hold back straps, a coupling means between the breeching portion and the girth and collar portions of the harness, and means whereby the coupling may be instantly released from the driver's seat to separate the breeching portion of the harness from the girth and collar portions, and thus release the draft animal.

The invention further consists in a whiffle-tree having detachable coupling means for the traces and adapted to be actuated simultaneously with the harness releasing means whereby the traces may be released from the whiffle-tree at the same time that the harness coupling means is operated.

The invention further consists in certain novel features of construction as hereafter shown and described and then specifically pointed out in the claims, and in the drawings illustrating the preferred embodiment of the invention, Figure 1 is a plan view of a harness, the thills including the whiffle-tree and a portion of the vehicle, with the improvement applied. Fig. 2 is a side elevation of the same. Fig. 3 is a perspective view detached of the coupling means between the two portions of the harness. Fig. 4 is an enlarged detail view of the coupling means between the traces and the whiffle-tree.

The improved device comprises a harness formed in two main sections, the forward section comprising the girth indicated as a whole at 10, and the rear portion indicated as a whole at 11, the forward portion having the back strap 12 leading rearwardly therefrom and terminating in a U shaped member 13 having eyes 14—15 in its terminals, and a smaller U shaped member 16 having eyes 17—18 swinging from the eyes 14—15 of the member 13, the member 16 adapted to be folded beneath the member 13 and substantially in parallel relation thereto.

The rear portion of the harness comprises a ring 19 to which the hip straps 20—21 are connected and leading downwardly to the breeching strap 22, while the crupper 23 extends rearwardly of the ring. The hold back straps 24—25 are connected to the forward ends of the breeching member 22 and lead to the thills indicated at 26—27 to which they are coupled in the usual manner, as shown. A pull cord or chain 28 leads rearwardly from the bend portion 29 of the U shape member 16, as shown.

To couple the two parts of the harness the member 13 is disposed above the ring 14 and the member 16 passed through the ring and extended forwardly and lies upon a guard strap 30 which is connected at its forward end at 31 to the back strap 12 and thus protects the back of the horse from contact with the members 28—29, which being preferably of metal would otherwise annoy the horse.

Traces are represented respectively at 32—33 and lead from the breast strap or collar either of which may be employed but for the purpose of illustration a conventional form of collar is indicated at 34.

The whiffle-tree represented at 35 is provided at the ends with forwardly extending arms 36—37 having a transverse aperture in their forward ends and swinging respectively at 38—39 upon the whiffle-tree outside of the arms 36—37 are two arms 40—41, the forward ends of the arms turned laterally as at 42—43 and extending through the apertures in the members 36—37, while their rear ends are connected by a cord or chain 44 from which a pull cord or chain 45 leads to a point convenient to the hand of the driver upon the seat 46 in the vehicle. The traces 32—33 are engaged respectively with the lateral offsets or extensions 42—43, and so long as the members 40—41 are connected to the arms 36—37 the horse will remain hitched to the whiffle-tree.

When thus arranged with the members 13—16 in locking position as shown in Figs. 1 and 2 and the traces duly connected to the offsets 42—43 the draft animal will remain coupled to the vehicle, and so long as the horse acts normally the pull cords will likewise remain inoperative and the vehicle be drawn forward in the ordinary manner. In event, however, of the animal becoming unruly or attempting to run away, the driver will simultaneously draw the pull cords 28—45 toward himself or rearwardly of the vehicle which will draw the rear ends of the members 40—41 toward each other and withdraw the lateral portions 42—43 from the arms 36—37 and at the same time draw the member 16 rearwardly and through the ring 19 and thus release the breeching portion of the harness including the hip straps and the ring from the remainder of the harness and thus releasing the horse from the vehicle, and leaving the breeching portion of the harness attached to the thills.

The improved device is simple in construction, can be inexpensively manufactured, and applied to vehicles of various forms, and effectually prevents injury to the occupants in event of the running away of the horse.

What is claimed, is:—

1. A harness comprising a forward portion including the girth portion back strap and the traces, a rear portion including the breeching hip straps and hold back straps, a ring connected to the hip straps, a coupling member connected to the back strap, a trip member swinging from the coupling member and extending through the ring, and a pull element leading from said trip member and through said ring and extending rearwardly of the harness.

2. The combination of a harness comprising the girth portion including the traces and the breeching portion including the hold back straps, coupling means between the breeching portions and the girth portions, a ring connected to the hip strap of the harness, a coupling member connected to the back straps, a trip member swinging from the coupling member and extending through the ring, a pull cord leading from said trip member and through said ring and extending rearwardly, a vehicle including the thills and the whiffle-tree, trace coupling means carried by the whiffle-tree, and a pull cord operating to release said trace coupling means.

In testimony whereof, I affix my signature, in presence of two witnesses.

WILLIAM H. $\overset{\text{his}}{\times}$ DAVIS.
$\phantom{WILLIAM H. \times}$ mark Witnesses:
W. J. BURROW,
A. D. MARKLAND.